N. HOTZ.
Coffee Pot.
No. 81,169. Patented Aug. 18, 1868.
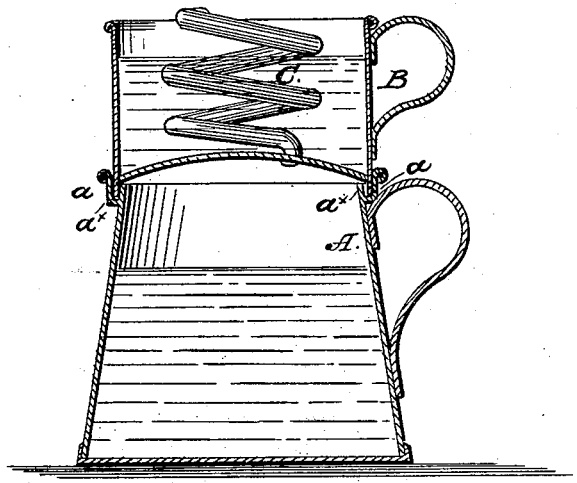
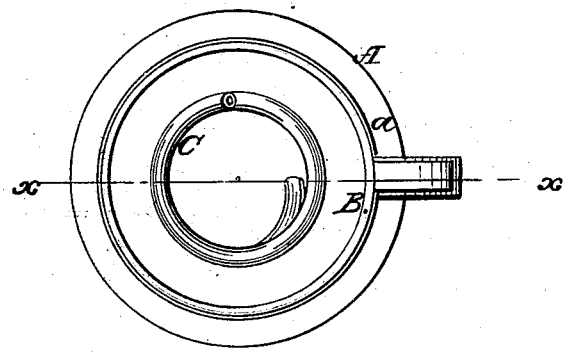

United States Patent Office.

N. HOTZ, OF GREENPOINT, NEW YORK.

Letters Patent No. 81,169, dated August 18, 1868; antedated August 5, 1868.

IMPROVEMENT IN COFFEE-POTS.

*The Schedule referred to in these Letters Patent and making part of the same.*

TO ALL WHOM IT MAY CONCERN:

Be it known that I, N. HOTZ, of Greenpoint, in the county of Kings, and State of New York, have invented a new and improved Culinary Vessel; and that the following description, taken in connection with the accompanying drawings, hereinafter referred to, forms a full and exact specification of the same, wherein I have set forth the nature and principles of my said improvements, by which my invention may be distinguished from all others of a similar class.

This invention relates to a new and improved culinary vessel of that class in which substances are cooked by the process of boiling, and is designed to prevent the escape of certain gaseous or vaporized portions of the substance being cooked, which give the aroma or agreeable flavor to the substance.

The invention is more especially designed to be applied to coffee-pots in order to retain, during the boiling of the same, the agreeable aroma, which is now chiefly expelled or dissipated.

In the accompanying sheet of drawings—

Figure 1 is a vertical central section of my invention, taken in the line $x$ $x$, fig. 2.

Figure 2, a plan or top view of the same.

Similar letters of reference indicate like parts.

A represents the body or main portion of a coffee-pot, the upper edge of which is provided with a flange, $a$, extending all around, and projecting out from it, to serve as a water-chamber to make a seal-joint or connection between the upper vessel B and the lower one, A. The upper vessel B is provided at its bottom with a pendant flange, $a^x$, which fits into the water-chamber made by the flange $a$, as shown clearly in fig. 1, and a perfectly steam-tight joint is thereby obtained.

C is a coiled pipe, placed within the upper vessel B, and communicating with the interior of A, and the vessel B is supplied with water.

The only vent the coffee-pot A is provided with is the coil-pipe C, the latter being open at its upper end, and communicating with the external air by attachment at an aperture in the side of the chamber $c$.

From the above description it will be seen that when the coffee is boiling, the steam will pass up into pipe C and be condensed therein, said pipe being in fact a condenser, and sufficiently efficient to condense all the gaseous or vapory substance containing the aroma, while at the same time a requisite vent is allowed to prevent the upper vessel being raised by the pressure of the steam in A.

I am aware that coffee-pots have been previously provided with condensers, in order to prevent the escape of aroma, but, so far as I am aware, the condensers have had no vent, and consequently the upper vessel containing the condenser or its cover, is invariably raised by the pressure of steam in the coffee-pot, and the aroma escapes.

This contingency is effectually obviated by my invention, the water-seal joint preventing any escape of steam or aroma between the two vessels, while the open upper end of the coil or condenser prevents any material pressure of steam against the bottom of the upper vessel, certainly not sufficient pressure to raise it and allow the steam or aroma to escape.

I am aware that condensers of somewhat similar construction have heretofore been used, but in which the steam from the coil escapes into a close or covered condenser; these, therefore, I do not claim.

Having thus described my invention, I claim as new, and desire to secure by Letters Patent—

The condenser C within the chamber B, having its one end open to the boiler A, and its other open to the atmosphere, by an orifice in the side of said condenser, substantially as and for the purpose specified.

N. HOTZ.

Witnesses:
WM. F. McNAMARA,
ALEX. F. ROBERTS.